(12) United States Patent
Krauz

(10) Patent No.: US 11,082,433 B2
(45) Date of Patent: Aug. 3, 2021

(54) SYSTEM AND METHOD OF ANALYZING AND AUTHENTICATING SCENARIOS AND ACTIONS THAT ARE TAKING PLACE IN A PLANT OR A FACTORY

(71) Applicant: HALO DIGITAL LTD, Tel Aviv (IL)

(72) Inventor: Achiel Krauz, Tel Aviv (IL)

(73) Assignee: HALO DIGITAL LTD., Tel Aviv (IL)

( * ) Notice: Subject to any disclaimer, the term of this patent is extended or adjusted under 35 U.S.C. 154(b) by 155 days.

(21) Appl. No.: 16/308,217

(22) PCT Filed: Jun. 6, 2017

(86) PCT No.: PCT/IL2017/050635
§ 371 (c)(1),
(2) Date: Dec. 7, 2018

(87) PCT Pub. No.: WO2017/212486
PCT Pub. Date: Dec. 14, 2017

(65) Prior Publication Data
US 2019/0268356 A1    Aug. 29, 2019

Related U.S. Application Data

(60) Provisional application No. 62/346,681, filed on Jun. 7, 2016.

(51) Int. Cl.
*H04L 29/06* (2006.01)
*G06N 20/00* (2019.01)
(Continued)

(52) U.S. Cl.
CPC .......... *H04L 63/1416* (2013.01); *G06F 13/00* (2013.01); *G06N 20/00* (2019.01);
(Continued)

(58) Field of Classification Search
CPC .............. H04L 63/1416; H04L 63/102; G06Q 10/0639; G06Q 50/04; G06F 13/00; G06F 21/50; G06N 20/00; G05B 23/024
See application file for complete search history.

(56) References Cited

U.S. PATENT DOCUMENTS 8,769,172 B2 * 7/2014 Softer ..................... G06F 13/00
710/64
10,755,196 B2 * 8/2020 Fano ...................... G06N 20/00
(Continued)

*Primary Examiner* — Daniel B Potratz
*Assistant Examiner* — Wansik You
(74) *Attorney, Agent, or Firm* — Browdy and Neimark, P.L.L.C.

(57) ABSTRACT

The present invention discloses a system and a method for analyzing and authenticating scenarios and actions that are taking place in a plant or a factory. Said analysis comprising the steps of: monitoring a plurality of data streams, originating from a plurality of independent sources within the plant. Said sources including at least part of production machines, machine sub-units, and independent indicators and sensors within the plant. •correlating between two or more monitored data streams, each relating to a specific action occurring within the plant, but originating from different data sources, or are of different data types; •analyzing said data stream correlations; and •obtaining specific characteristics that indicate the occurrence of specific actions within the plant.

23 Claims, 8 Drawing Sheets

(51) Int. Cl.
*G06Q 50/04* (2012.01)
*G06Q 10/06* (2012.01)
*G06F 13/00* (2006.01)
*G05B 23/02* (2006.01)

(52) U.S. Cl.
CPC ......... *G06Q 10/0639* (2013.01); *G06Q 50/04* (2013.01); *H04L 63/102* (2013.01); *G05B 23/024* (2013.01)

(56) References Cited

U.S. PATENT DOCUMENTS

| | | |
|---|---|---|
| 2005/0131656 A1 | 6/2005 | Ikeda et al. |
| 2007/0093929 A1* | 4/2007 | Kreidler ............... G05B 19/042 700/169 |
| 2016/0098037 A1* | 4/2016 | Zornio .................. H04L 43/045 700/20 |

* cited by examiner

| Scenario analysis module - continued |
|---|

3335 — Authenticating the correctness of a machine's operation during the execution of the said actions or scenarios, based on correlating between data streams of monitored machines or machine sub-units and data streams of Independent indicators and sensors. Propagating the authentication results to the Alerts generation module.

3340 — Obtaining expected production machines' data stream output per each production machine configuration, optionally by applying machine learning algorithms to ascertain the linkage between a given configuration and the expected output stream. authenticating the configuration of production machines by correlating their emitted output data streams with the said expected output streams.

3345 — Identifying irregularity in action or scenario parameters and characteristics based on the said authentication steps. Propagating irregularity notifications to the Alerts generation module. Storing suspected irregularity events in a Knowledge-base within the inspector cluster file system. Said irregularities include at least part of: suspected malfunctions, erroneous configurations, and suspected cyber security breaches.

3350 — Creating a log of the said identified suspected irregularities in machine configuration or operation.

3355 — Extracting parameters of correlation between data streams emitted by different monitored machines and machine sub-units, to gain insight on the mutual effect of the said monitored units on one-another.

3360 — Extracting parameters of correlation between data streams emitted by monitored machines and machine sub-units (which are respective to actions and scenarios performed by the said machine) and independent indicators and sensors within the plant (which represent the conditions on the plant). Gaining insight by applying machine learning on the effect of the operation of the said monitored machines and machine sub-units on plant conditions (e.g. Physical, Chemical, Electrical conditions). Storing such correlation parameters in a Knowledge-base within the inspector cluster file system.

3365 — Storing historic events of real world scenarios and actions, and their respective data stream parameters and characteristics in the inspector-cluster Knowledge-base. This Knowledge-base can be queried for further analysis according to timing, actions and events, and in regards to specific machines, units and modules in the plant.

Fig 7

SYSTEM AND METHOD OF ANALYZING AND AUTHENTICATING SCENARIOS AND ACTIONS THAT ARE TAKING PLACE IN A PLANT OR A FACTORY

FIELD OF THE INVENTION

The presented invention generally relates to the field of factory planning and management systems. More specifically, it relates to the authentication of production machines and machine sub-units configuration and operation, in respect to scenarios and actions that are executed in the plant.

DISCUSSION OF RELATED ART

Known in art processes of managing in plants and factories world-wide, enable gathering of information from the factories machine and sensor to monitoring.

The current state of the art does not relate to platforms that would accommodate a comprehensive, configurable process of automatic authentication of the actual raw data received from the said origins. Raw data input streams are thus susceptible to drifts in accuracy, failures in authenticity, and may be maliciously compromised by perpetrators from within and outside the plant.

SUMMARY OF THE INVENTION

The present invention discloses a method for analyzing actions that are taking place in a plant or a factory, implemented by one or more processors operatively coupled to a non-transitory computer readable storage device, on which are stored modules of instruction code that when executed cause the one or more processors to perform the steps of:
  monitoring a plurality of data streams, originating from a plurality of independent sources within the plant or factory;
  correlating between two or more monitored data streams, all streams relating to a specific action occurring within the plant, but originating from different data sources, or are of different data types; and
  analyzing said data stream correlations, to obtain specific parameters and characteristics that indicate the occurrence of specific actions that have taken place in the plant.

According to one embodiment of the said method, at least one said correlated data stream originates from tapping onto machines or machine sub-units within the plant, and another said correlated data stream originates from sensors or indicators located within the plant's production systems or environment;

According to one embodiment of the said method, at least one said correlated data stream originates from tapping onto communication lines within the plant.

According to one embodiment of the said method, at least one said correlated data stream originates from IT information, communicated over the plant's network.

According to one embodiment, the said method further comprises at least one of the following steps:
  identifying the occurrence of multiple actions within the plant;
  identifying a scenario that is comprised of said multiple identified actions, said scenario taking place within the plant at any hierarchical level; and
  identifying the status of machines and machine sub-units within said identified scenario.

According to one embodiment, the said method further comprises at least one of the following steps:
  applying machine learning algorithms to extract characteristics and parameters of said correlations, and identify the mutual influence of machines and/or machine sub-units on each other within the plant; and
  applying machine learning algorithms to extract characteristics and parameters of said correlations, and identify the mutual effect of machines' and machine sub-units' operation on the conditions in the plant, said conditions including at least one of physical, chemical, electrical and environmental conditions.

According to one embodiment, the said method further comprises the step of applying machine learning algorithms to the said extracted characteristics and parameters of said correlations, thus iteratively refining the analysis of actions and scenarios taking place within the plant.

According to one embodiment, the said method further comprises the step of obtaining expected characteristics and parameters of monitored data streams by:
  applying a machine learning algorithm to extract the correlation between specific machine configurations and the characteristics and parameters of the monitored data streams; or
  by user configuration, according to prior knowledge.

According to one embodiment, the said method further comprises the steps of:
  comparing said expected characteristics and parameters of said data streams with those of actual input data streams; and
  identifying conditions of production machines' malfunction or configuration problems according to differences found in the said comparison.

According to one embodiment, the said method further comprises the steps of:
  analyzing said suspected malfunction in relation to at least one additional input data stream, and in relation to a list of required system configurations; and
  identifying suspected conditions of erroneous system configuration according to said analysis.

According to one embodiment, the said method further comprises the steps of:
  obtaining captured video streams originating from various human interface sources, including at least one of: dedicated Human Machine Interface (HMI) screens, front-end operators' PC screens, control panels and on-site CCTV cameras;
  identifying the conditions of said human interface sources;
  monitoring human actions applied to said human interface sources, including at least one of mouse movements, button clicks, GUI selections, GUI elements' activation, text insertion, element changes and image changes; and
  identifying application of human actions to processes within the plant, including at least one of: user intervention, configuration changes, and misuse of equipment.

According to one embodiment, the said method further comprises the steps of:
  analyzing a said suspected condition of erroneous system configuration in relation to monitored data pertaining to human interface sources; and
  identifying suspected conditions of cyber security breaches according to the said analysis.

According to one embodiment of the said method, the communication between the sources of input data streams and the system which analyzes the said streams is unidirectional, thus disabling the configuration of data sources from within the said system 10, and providing security against cyber attacks targeting the said input data sources.

According to one embodiment of the said method, at least part of the said sources of input data streams are communicatively connected to the said analysis system through secured P2P connections, and are thus controllable by dedicated components of the analysis system.

According to one embodiment the said method further comprises the step of maintaining a knowledgebase withholding at least part of the following information:
  historical actions and scenarios that have been executed throughout the plant;
  historical events of system alerts and irregularities in data authentication;
  expected characteristics and parameters of correlation between input data streams of different sources;
  expected output data of specific machines and machine sub-units, following the execution of actions and scenarios by the said units; and
  observed actual output data of machines and machine sub-units, following the execution of actions and scenarios,
wherein said knowledgebase is made accessible for data querying by administrative users via a front-end subsystem.

According to one embodiment of the said method, the said front-end subsystem is the only human interface to the entire system, said front-end subsystem is set as an encrypted, separated environment, and is connected to the rest of the system via unidirectional communication, thus facilitating at least one of the following measures of precaution for maintaining cyber security:
  authorized users are granted permission to configure the analysis system;
  users are denied access to the actual sources of input data streams; and
  users are granted read-only access to the knowledgebase.

The present invention further discloses a system for analyzing actions that are taking place in a plant or a factory, comprising one or more non-transitory computer readable storage devices and one or more processors operatively coupled to the storage device(s) on which are stored modules of instruction code executable by the one or more processors, said system comprising at least part of:
  a collector cluster (1100), comprising at least one collector module (1101), configured to monitor a plurality of data streams (100), originating from a plurality of independent sources (101, 102, 103, 104, 105) within the plant;
  a scenario analysis module (3300), correlating between two or more monitored data streams that are related to a specific action occurring within the plant, but originating from different data sources (101, 102, 103, 104, 105), or are of different data types;
  wherein said scenario analysis module (3300) is further configured to analyze said data stream correlations, and obtain specific parameters and characteristics that indicate the occurrence of specific actions that are taking place in the plant.

According to one embodiment of the said system, at least one of said data stream originates from tapping onto machines or machine sub-units within the plant (101), and at least one other said data stream originates from sensors and indicators located within the plant's production systems or environment (103);

According to one embodiment of the said system, at least one said data stream originates from tapping onto communication lines within the plant.

According to one embodiment of the said system, at least one said data stream originates from IT information, communicated over the plant's network.

According to one embodiment of the said system, the scenario analysis module (3300) is further configured to perform at least one of:
  identifying the occurrence of multiple actions within the plant;
  identifying a scenario that is comprised of said identified multiple actions, said scenario taking place within the plant at any hierarchical level; and
  identifying the status of machines and machine sub-units within said scenario.

According to one embodiment of the said system, the scenario analysis module (3300) is further configured to perform at least one of the following:
  applying machine learning algorithms to extract characteristics and parameters of said correlations, and identify the mutual influence of machines and/or machine sub-units on each other within the plant; and
  applying machine learning algorithms to extract characteristics and parameters of said correlations, and identify the mutual effect of machines' and machine sub-units' operation on the conditions in the plant, said conditions including at least one of physical, chemical, electrical and environmental conditions.

According to one embodiment of the said system, the scenario analysis module (3300) is further configured to apply machine learning algorithms to the said extracted characteristics and parameters of said correlations, thus iteratively refining the analysis of actions and scenarios taking place within the plant.

According to one embodiment of the said system, the scenario analysis module (3300) is further configured to obtain expected characteristics and parameters of monitored data streams by:
  applying a machine learning algorithm to extract the correlation between specific machine configurations and the characteristics and parameters of the monitored data streams; or
  by user configuration, according to prior knowledge.

According to one embodiment of the said system, the scenario analysis module (3300) is further configured to:
  compare expected characteristics and parameters of said data streams with those of actual input data streams; and
  identify conditions of production machines' malfunction or configuration problems according to differences found in the said comparison.

According to one embodiment of the said system, the scenario analysis module (3300) is further configured to:
  analyze said suspected malfunction in relation to at least one additional input data stream, and in relation to a list of required system configurations; and
  identify suspected conditions of erroneous system configuration according to said analysis.

According to one embodiment of the said system, the scenario analysis module (3300) is further configured to:
  obtain captured video streams originating from various human interface sources, including at least one of: dedicated Human Machine Interface (HMI) screens, front-end operators' PC screens, control panels and on-site CCTV cameras;

identify the conditions of said sources;
monitor human actions applied to said human interface sources, including at least one of mouse movements, button clicks, GUI selections, GUI elements' activation, text insertion, element changes and image changes; and
identify application of human actions to processes within the plant, including at least one of: user intervention, configuration changes, and misuse of equipment.

According to one embodiment of the said system, the scenario analysis module (3300) is further configured to:
analyze a said suspected condition of erroneous system configuration in relation to monitored data pertaining to human interface sources; and
identify suspected conditions of cyber security breaches according to the said analysis.

According to one embodiment of the said system, the communication between the sources of input data streams (100) and the scenario analysis module (3300) is unidirectional, thus the configuration of data sources (100) is disabled from within the said scenario analysis module (3300), providing security against cyber attacks targeting the said input data sources.

According to one embodiment of the said system, at least part of the said sources of input data streams 100 are communicatively connected to dedicated collectors (1101) via secured P2P connections, and are thus controllable by said dedicated collectors (1101).

According to one embodiment, the said system further comprises a knowledgebase (3500) withholding at least part of the following information:
historical actions and scenarios that have been executed throughout the plant;
historical events of system alerts and irregularities in data authentication;
expected characteristics and parameters of correlation between input data streams of different sources;
expected output data of specific machines and machine sub-units, following the execution of actions and scenarios by the said units; and
observed actual output data of machines and machine sub-units, following the execution of actions and scenarios,
wherein said knowledgebase (3500) is configured to be accessible for data querying by administrative users via a front-end subsystem (2000).

According to one embodiment of the said system, said front-end subsystem (2000) is an encrypted environment, communicatively connected to said collectors (1101) knowledgebase (3500) and scenario analysis module (3300) via unidirectional communication, thus providing at least one of the following measures of precaution for maintaining cyber security:
granting authorized users permission to configure the scenario analysis module (3300);
denying users access to the actual producers of input data streams (101, 102, 103, 104, 105); and
granting users read-only access the knowledgebase 3500.

BRIEF DESCRIPTION OF THE DRAWINGS

The present invention will be more readily understood from the detailed description of embodiments thereof made in conjunction with the accompanying drawings of which:

FIGS. 6 and 7 jointly present a flow diagram of the function of the Scenario analysis module 3300.

DETAILED DESCRIPTION OF SOME EMBODIMENTS OF THE INVENTION

Figure 1:
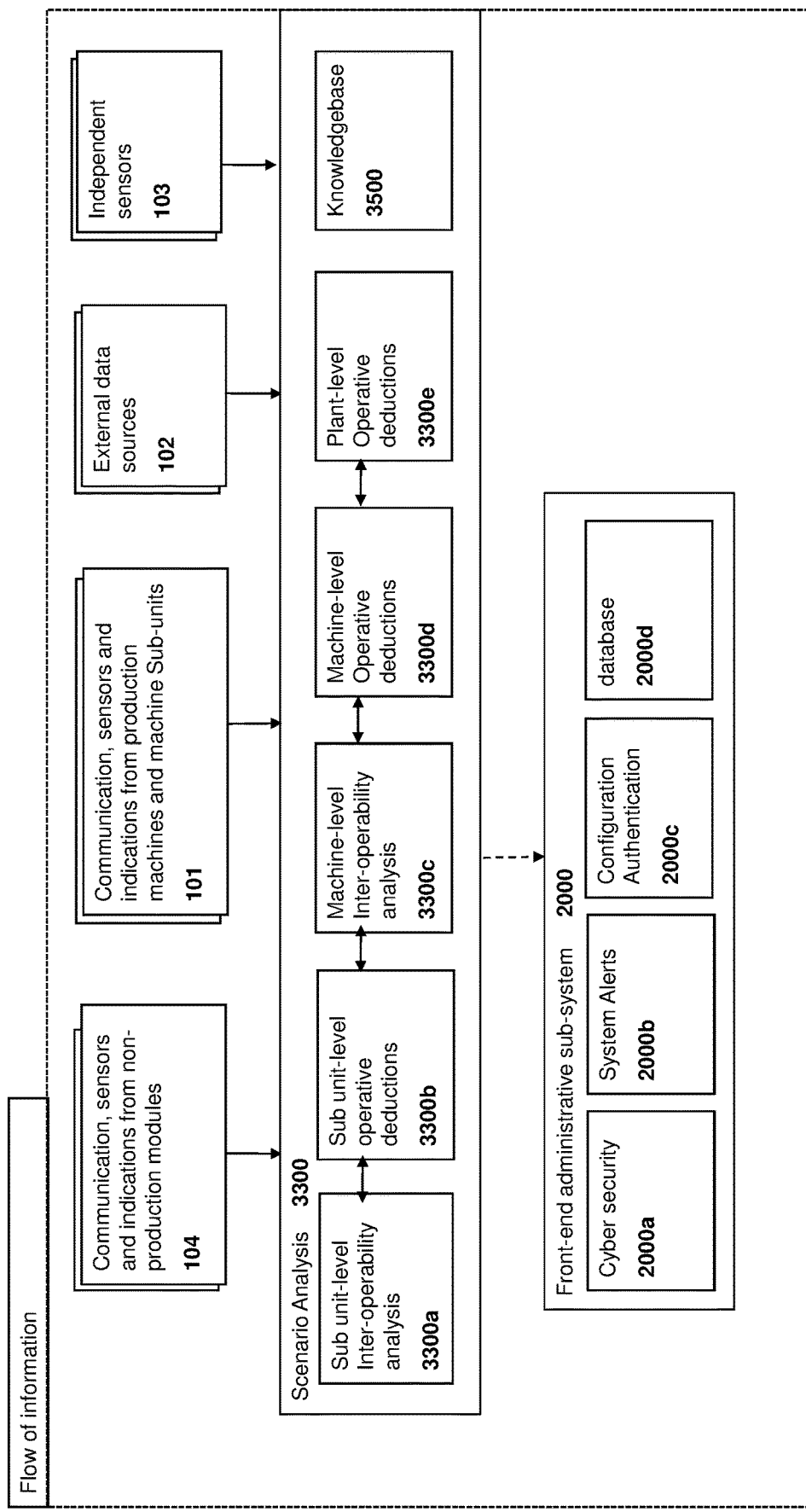
FIG. 1 is a diagram which depicts the flow of information within the system of the said invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention described henceforth relates to a system and a method designed to produce a knowledgebase, withholding the relations and effect of different units in a plant on one another, and on independent sensors and indicators located throughout the plant.

The said Knowledgebase relates to all hierarchical levels in the plant; from a machine sub-unit level, via a production machines' level to the level of an entire plant or factory. The knowledgebase is assembled through a continuous process of correlation between independent input data streams 100, and extraction of correlation parameters to understand the conditions and events that are taking place in the plant.

The said Knowledgebase serves as a reference for authenticating the correctness of production machines' operation and configuration, and can be queried for further analysis according to timing, actions and events, and in regards to specific production machines and sub-units in the plant.

Following is a table of definitions of the terms used throughout this application.

| Term | Definition |
|---|---|
| Inspector hosts | Inspector hosts are computers which serve as building blocks of an Inspector Cluster. The Inspectors partake in cluster computing; analyzing incoming data, storing required information, and producing Alerts information en-route the front end. The computational activity of Inspectors is divided into basic logic units referred to as 'Inspector logic units', and is managed by a central module referred to as an 'Engine'. |

-continued

| Term | Definition |
| --- | --- |
| Inspector cluster | A group of Inspector hosts linked together, working as a single computational unit. The cluster performs the following tasks:<br>    Short term and long term reliable storage of events<br>    Parallel processing and analyzing of big data.<br>    Production of Alerts, observed by the Front end. |
| Inspector logic units | The basic computational building blocks that are carried out in parallel on Inspector hosts in the Inspector cluster. The execution, prioritizing, scheduling and resource handling of these Inspector logic units are handled by one or more Engines. |
| Plant | An installation, organization or factory containing machines that are monitored and controlled by the said invented system |
| Hierarchical level | The term "hierarchical level" is used throughout this document to express any level of functionality within the plant, e.g.: a machine sub-unit's level, a production machine's level, a production line level and a plant level. |
| Collectors | Computers which reside on a customers' plant. Collectors produce raw event data which is the basis for analysis in the system. Collectors may also receive control and feedback messages from the Front end module to change their status of operation. |
| Event Aggregator | A module which aggregates and buffers raw data originating from the Collectors, and relays it onto the Cluster's File system (e.g. HDFS). It may be implemented in a multi-tiered architecture, in which each layer provides buffering and aggregation services to its predecessor, thus adding robustness to handling of a large numbers of input streams 100 and peaks conditions. |
| The front-end subsystem | An encrypted environment separated from the data collection and Data analysis subsystems by means of unidirectional optical gateways. The front-end subsystem serves to:<br>    Customize system appearance and function according to users' requirements<br>    Provide feedback and control messages to the collectors<br>    Accumulate processed data and Alerts and output of system queries on a designated database |
| Alert | Messages that portray the condition and status of elements on the plant site. They are provided to the Front-end from the Inspectors cluster, following analysis of raw Collector's event data |
| Batch processing sub-system | A sub-system responsible for data analysis and alert generation. It takes collectors sequence files as an input and generates alerts for the front end. It runs on top of the Inspector cluster. |
| Scenario | The word 'Scenario' serves to describe a complex operation, carried out by monitored machines in the real-world plant environment (e.g.: painting of a car by an assembly-line robot). Scenarios are normally comprised of several 'Actions' (see below). |
| Action | The word 'Action' serves to describe a fundamental or basic operation performed by monitored machines or machine sub-units in the real-world plant environment (e.g.: an assembly-line robot is moving its arm by 10 cm). |
| Characteristics and parameters | The terms "Characteristics" and "Parameters" are used in relation to actions and scenarios that are carried-out by monitored machines in the plant to describe the properties of the said actions and scenarios. This terminology emphasizes the different qualities ("Characteristics") of a machine's operation (e.g. a motor's revolution) and parameters (e.g. the actual value in RPM).<br>The terms "Characteristics" and "Parameters" are used in relation to identified correlations between analyzed input data streams, to describe the properties of the said correlations. This terminology emphasizes the different qualities ("Characteristics") of said identified correlations (e.g. positive/negative correlation) and parameters (e.g. correlation in relation to specific frequencies, time frames etc.) |
| Knowledgebase | The term 'Knowledgebase' serves to describe the sum of accumulated information regarding:<br>    The mutual effect of production machines and machines sub units on each other<br>    the measureable effect of such modules on sensors and indicators within the plant, and<br>    the effect of environmental conditions on the operation of such modules.<br>This data is accumulated and stored on the Inspector-cluster file system, and can be queried and employed in order to enhance the understanding of scenarios and actions that are carried out in the plant. |

FIG. 1 is a diagram which depicts the flow of information within the system of the said invention. It does not present actual components of the said invented system, but rather illustrates abstract functional blocks, for the benefit of conceptual clarity.

Input data streams 100 flow into the system from a plurality of sources. This data and is acquired by:
- Tapping onto production machines and machine sub-units (e.g. current measurements relating of specific actuators);
- Tapping onto communication lines within the plant (e.g. Ethernet communication on LAN cables, VGA or HDMI display cables, $I^2C$ or SPI configuration lines, etc.)
- Various sensors and indicators located within the plant's production systems or environment (e.g. temperature sensors, closed circuit cameras, audio sensors, etc.); and
- IT information, communicated over the plant's network (e.g. configuration of specific machines, specific software deployment, user permission levels etc.).

The system combines the said data and analyzes it, to produce a comprehensive understanding of the actions and scenarios that are taking place within the plant.

The different data sources are categorized according to the following types:
- Production machines, and machine sub-modules 101 provide indications (e.g. operation mode, alerts) and sensory data (e.g. power consumption or specific motor's RPM).
- Communication signals (e.g. commands and data information) sent to/from production machines, and machine sub-modules 101. Such communication may be (but is not limited to) transferred over LAN cables, Fiber optics, Audio, VGA, GPIO, CAN Bus, $I^2C$ lines, SPI lines etc.
- Communication, indications and sensory data from non-production modules within the plant 104 (e.g. temperature reading on the AC system, or status of UPS units)
- Various sources of external data 102 (e.g. local temperature reported by an online weather service)
- Various independent sources of sensory data 103 (e.g. physical, chemical, electric or environmental data) within the plant, which are relevant to the production process, but do not originate in the production machines themselves. For example:
  - Video feeds from cameras within the plant
  - Screen capture of monitors and computer displays within the plant
  - Environmental measurements (e.g.: Humidity, Temperature)
  - Magnetic or Electro-magnetic disturbances
  - Acoustic and Vibration measurements
  - Chemical measurements (e.g. PH, concentration of solutions, etc.)

The said information is aggregated and arranged by dedicated hardware and software systems (not shown in FIG. 1), and propagated to the Scenario Analysis module 3300 for analysis on multiple levels;
- Sub-unit level operative deduction 3300*b*: Deducing information regarding the sub-units' operation, in respect to actions and scenarios that are taking place in the plant, for example:
  - Correlations between different sensory data sources provide indications for the functionality of machine sub-units (e.g.: joining independent audio-sensory and electrical current measurements may verify the operation of a specific motor).
  - The identification of occurrence of multiple actions within the plant (e.g. movement of single actuators), jointly comprising a comprehensive scenario (e.g. robot painting an automobile on the assembly line).
  - Influence of the sub-unit's operation on measurable Physical, Chemical or Electrical conditions within the plant (e.g.: operation of certain machines may produce measurable vibrations). Such measurable conditions may serve as new indicators of machine sub-units' operation
- Sub-unit level inter-operability analysis 3300*a*:
  - Monitoring and analyzing sub-units' mutual influence one-another during the performance of a specific action.
  - Monitoring and analyzing sub-units' hierarchical influence (e.g.: on the operation of an entire production machine) during the performance of a specific action.
- Production-machine level operative deduction 3300*d*: Deducing information regarding the machine's operation, in respect to actions and scenarios that are taking place in the plant, for example:
  - Correlations between different sensory data sources will provide indications for the functionality of the production machine (e.g.: a camera may verify that an assembly-line robot is performing its assigned task).
  - Influence of the machine's operation on measurable Physical, Chemical or Electrical conditions within the plant
  - Correctness of the production-machine's configuration and operation, in respect to actions and scenarios that are taking place in the plant. Such information may serve to assess the probability for a system malfunction or cyber security breach event.
- Production-machine level inter-operability analysis 3300*c*:
  - Monitoring and analyzing the operation of production machines and extracting parameters and characteristics relating to their mutual influence during the performance of specific actions or scenarios within the plant.
  - Monitoring and analyzing machines' hierarchical influence (i.e.: on the operation of the entire plant or assembly line) during the performance of a specific action or scenario.
- Plant-level Operative deductions 3300*e*: Integrating information from the lower-level Scenario analysis (Production machine and machine sub-unit inter-operability and operative deduction) modules, to obtain comprehensive, real-time reflection of the actions and scenarios that are being performed in the plant.

The processed information obtained in the Scenario analysis module 3300 is stored in a database referred to as the knowledgebase 3300*f*. The knowledgebase includes (but is not limited to) the following information:
- Correlation between output data streams of different sensors and indicators and specific machines and machine sub-units, during the operation of specific actions and scenarios within the plant,
- Characteristics and parameters of mutual influence of machines and machine sub-units on each other, and Characteristics and parameters of influence of machines and machine sub-units on the conditions in the plant, as they are indicated or sensed by independent sensors within the plant.

The information obtained in the scenario analysis module 3300 is further processed to obtain specific indications that are propagated to the Front-end administrative sub-system. These indications include for example:

System alerts information 2000*b*, following the identification of a predefined condition, such as system malfunction.

Authentication of the system's configuration and operation 2000*c* according to its assigned configuration.

Determining the system's cyber security condition 2000*a* and whether the configuration or operation conditions of a machine or a machine sub-unit has been tampered with.

Such indications are stored on a dedicated database 2000*d* within the Front-end subsystem.

Figure 2:
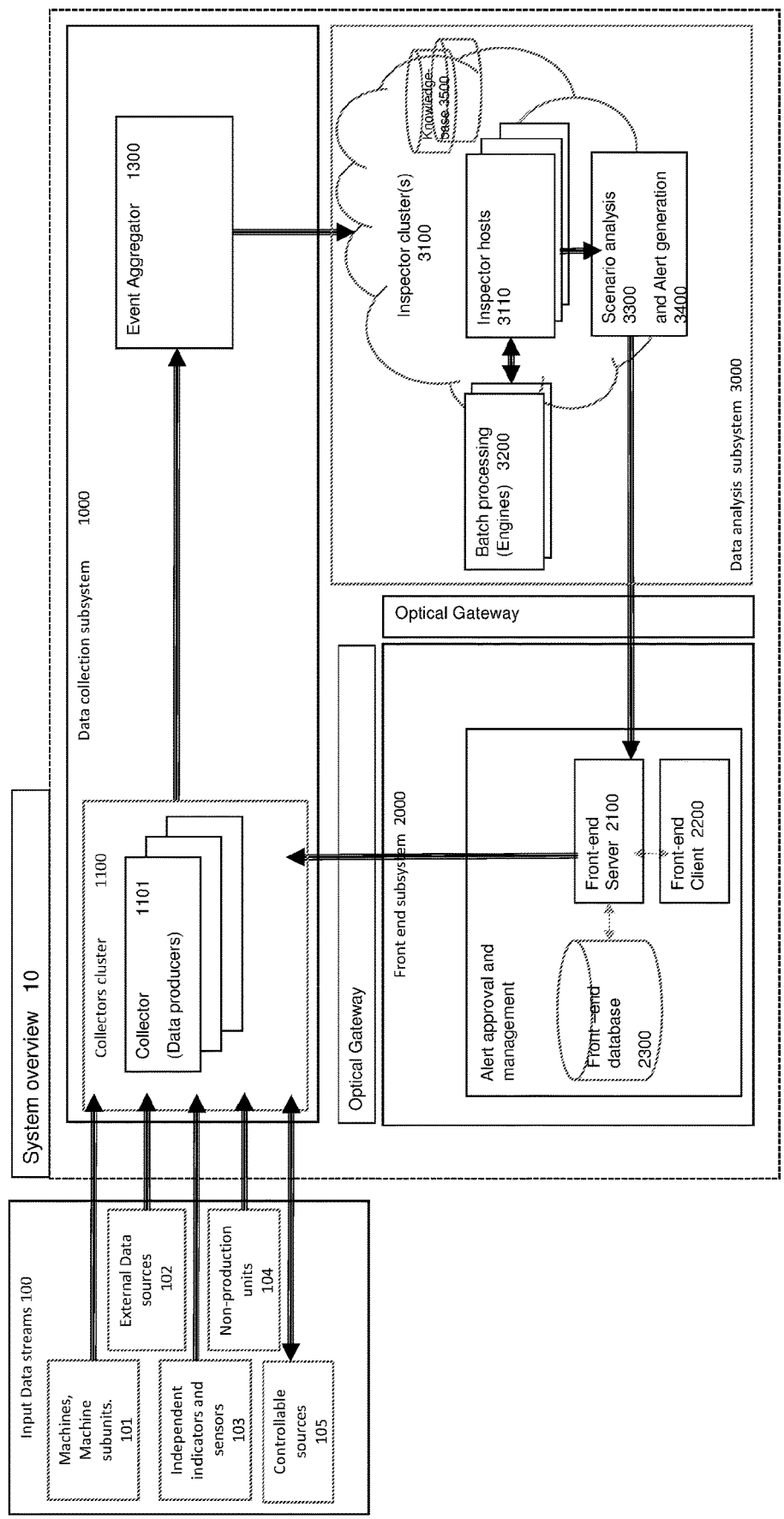
FIG. 2 illustrates a block diagram, elaborating the overall structure of the invented system.

FIG. 2 shows a block diagram, elaborating the overall structure of the invented system.

Input data streams 100 flow into the system from a plurality of sources. These sources are categorized according to the following types:

Production machines and machine sub-modules 101 provide indications (e.g.: operation mode, alerts), sensory data (e.g. power consumption or specific motor's RPM) and communication signals (e.g.: VGA, GPIO, LAN cables, Fiber optics, etc.).

Communication, indications and sensory data from non-production modules within the plant 104 (e.g. temperature reading on the AC system, or status of UPS units)

Various sources of external data 102 (e.g. local temperature reported by an online weather service)

Various independent sources of sensory data 103 (e.g. Physical, Chemical or Electronic data) within the plant, which are relevant to the production process, but do not originate in the production machines themselves. For example:

Video feeds from cameras within the plant

Screen capture of monitors and computer displays within the plant

Acoustic and Vibration measurements

The said input data is propagated to the Data collection sub unit 1000, where it is collected by the Collector Cluster 1100. Collectors 1101 are computers which reside on a customers' operation plant. They produce raw event data which is the basis for analysis in the system.

According to one embodiment, the communication between the sources of input data streams and collectors 1101 within the collector cluster 1100 is unidirectional, i.e. data is flowing from the sensors to the collectors. For example, a CCTV camera may be transferring video streams to a collector 1101 in a unidirectional manner. This constellation in this embodiment detaches the configuration of input data sources 100 from any machine within the plant, and provides security against cyber attacks targeting the said sources.

According to another embodiment, at least part of the said sources of input data streams are controllable sources 105. These sources are communicatively connected to specific controllers 1101 through secured P2P connections, and are configured to be controllable by dedicated collectors 1101. For example, the CCTV camera mentioned above may be connected via USB communication to a specific controller, and prompted to operate via that connection in response to a command from a collector 1101 (e.g. following detection of movement).

According to one embodiment, the said sources of input data streams forward raw data (e.g.: video data streams) to the collector cluster 1100. According to another embodiment, at least some of the said sources of input data streams perform basic analysis of acquired data, and forward the results of this analysis to the collector cluster 1100. In relation to the CCTV example above, the camera may be configured to recognize the presence of a person in the room, and propagate that information to the collector cluster 1100.

According to one embodiment, collectors receive control and feedback messages from the Front-end 2000 subsystem to change their status of operation.

Data collected by the collector 1101 members of the collector cluster 1100 is propagated to the "Event Aggregator" module 1300.

According to one embodiment, collectors 1101 may be configured to perform low-level analysis of the data they acquired, and forward the analyzed data to the event aggregator 1300. For example, a collector 1101 may be configured to combine information from two audio sensors, in order to cancel environmental noise on the acquired audio.

The event aggregator 1300 module aggregates and buffers raw data originating from the Collectors 1101, and relays it onto the Cluster's File system (e.g. HDFS) 1320. The functionality of this module is further elaborated below, in relation to FIG. 3.

Aggregated data is propagated to the data analysis sub unit 3000. This unit is comprised of:

The Inspector cluster 3100: A cluster of computers referred to as Inspector hosts 3110, which cumulatively execute tasks of manipulation and processing of big data.

The "Batch Processing" module manages the tasks performed on the Inspector cluster 3200, and The scenario analysis 3300 module performs high-level analysis of the input data. This analysis enhances the Knowledgebase; it produces information regarding the performance of monitored machines and subunits in respect to real-world events, their mutual influence, and their influence on the plant's work environment.

The alerts generation 3400 module produces alert notifications to administrators of the Front-end subsystem 2000. These alerts follow the recognition of predefined events by the scenario analysis module 3300.

The Knowledgebase 3500 is a database which withholds at least part of the following information:

Historical actions and scenarios that have been executed throughout the plant.

Historical events of system alerts and irregularities in data authentication.

Expected correlations between input data streams of different sources, as provided initially on the basis of preliminary knowledge. For example: a production machine's motor's decoder indicates the motor's position. This information is expected to correlate with a video input stream, depicting the machine's location.

Parameters of correlations between input data streams of different sources as produced by the Scenario analysis module 3300. Pertaining to the previous example, the said machine's location as depicted by the video input stream may lag behind the reading of the said motor decoder's position. This kind of information enhances the understanding of processes as they actually occur in the plant.

Expected output data of specific machines and machine sub-units, following the execution of actions and scenarios by the said units. This information is initially introduced into the database by means of preliminary knowledge. For example: the nominal value of current drawn by a motor.

Observed actual output data of machines and machine sub-units, following the execution of actions and scenarios. Pertaining to the previous example, the actual measured current that is observed and correlated to the execution of specific actions may be higher than the nominal value. A tendency of increasing current draw may indicate processes of degradation in the functionality of an assembly line.

The results of the Data analysis subsystem are propagated to the Front-end subsystem. The Front-end subsystem is an encrypted environment, accessible to authorized personnel's use only. It is separated from the data collection 1000 and Data analysis 3000 subsystems. This separation is optionally implemented, according to one embodiment of the said invention, by means of unidirectional optical gateways.

The front-end 2000 subsystem serves to:
Customize system appearance and function according to users' requirements
Provide feedback and control messages to the collectors
Provides a platform for alert approval and management
Accumulate processed data and alerts' information on a designated database The Front end subsystem is comprised of the following components:
Front-end Server 2100: The main system's engine, providing at least one of the following capabilities:
Authenticating the identity of logged-in users
Managing the system configuration (e.g. defining Alert conditions for the Alerts generation module 3400)
Setting parameters of the data analysis subsystem 3000 that relate to the monitored production machines and sub-units (e.g. expected machine output following a given configuration).
Setting parameters of the data analysis subsystem 3000 that relate to the inter-operability of machines and sub units (e.g. the effect of one machine on another).
Setting the parameters of the data analysis subsystem 3000 that relate to production machines' influence on the plant's environment, as detected by independent sensors (e.g. the production of noise following execution of a specific action by a machine).
Managing the Front-end sub-system's database
Front-end Client 2200: The Front-end Server's client interface 2200, facilitates at least one of the following capabilities:
Managing users and their accessibility options
Managing alerts and notifications obtained by the data analysis subsystem 3000
Applying queries on the Inspector-cluster Knowledgebase
Assigning system configuration and parameters' setup through the Front-end Server 2100
Front-end Database 2300, withholding tables of at least one of the following:
System users, and their administrative privileges
Historic alerts and notifications that had been obtained by the data analysis subsystem 3000
Answers that had been obtained to queries on the Inspector-cluster Knowledgebase The Front end subsystem 2000 is the only human interface to the entire system. It affects the data flow in one direction only; from the collector nodes onwards, denying unauthorized access to the actual producers of data. This is a measure of precaution for maintaining cyber security.

The Front-end subsystem presents feedback and alert indications to authorized personnel in regards to:
Cyber Security
System operation, malfunction and alerts
Authentication of configuration and operation, in regards to real-time scenarios that are being performed in the plant
Changes made to the knowledgebase, indicating an improvement of the characterization of processes in the plant. For example: An audible, distinguishable sound is noticed whenever a pump is operated. A machine learning algorithm may consequently detect a correlation between the input data streams of the microphone recording the sound and the measured power consumption of the pump. Characteristics and parameters of this correlation are stored in the knowledgebase, and indicated to user. The user may choose to integrate this new information in the operation of the scenario analysis module 3300, as the lack of or a change in the recorded sound may imply a malfunction. In this method, the user will have improved the analysis process iteratively, by adding a new analysis procedure (correlation between noise and power consumption readings).

Figure 3:
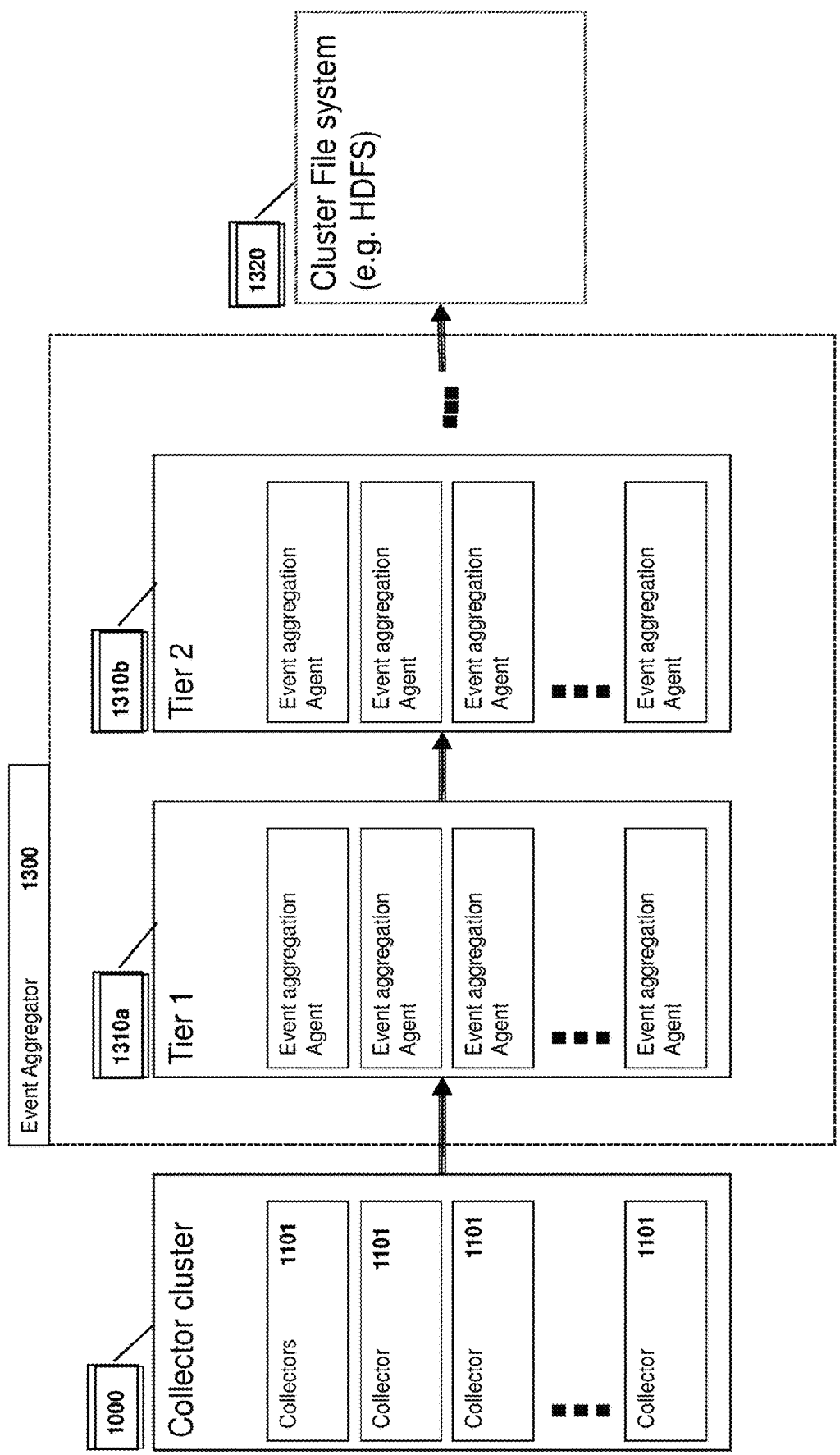
FIG. 3 illustrates a block diagram of the Event Aggregator module and its vicinity.

FIG. 3 shows a block diagram of the Event Aggregator module 1300 and its vicinity. This module aggregates and buffers raw data originating from the Collectors 1101, and relays it onto the Cluster's File system (e.g. HDFS) 1320. It may be implemented in a multi-tiered architecture (1310*a*, 1310*b*), in which each tier provides buffering and aggregation services to its predecessor, thus adding robustness to handling of a large numbers of input streams and peaks conditions.

The Event Aggregator module 1300 provides a solution to the following restrictions and limitations:
The system may have a limited number of Collectors 1101 it could handle simultaneously
Different Collectors 1101 may not be able to access the same resources (e.g. write to the same files), resulting in additional buffering needs
The collectors may create temporary data peaks which can bring the system to its 10 limit and cause loss of data or cluster failure.

Figure 4:
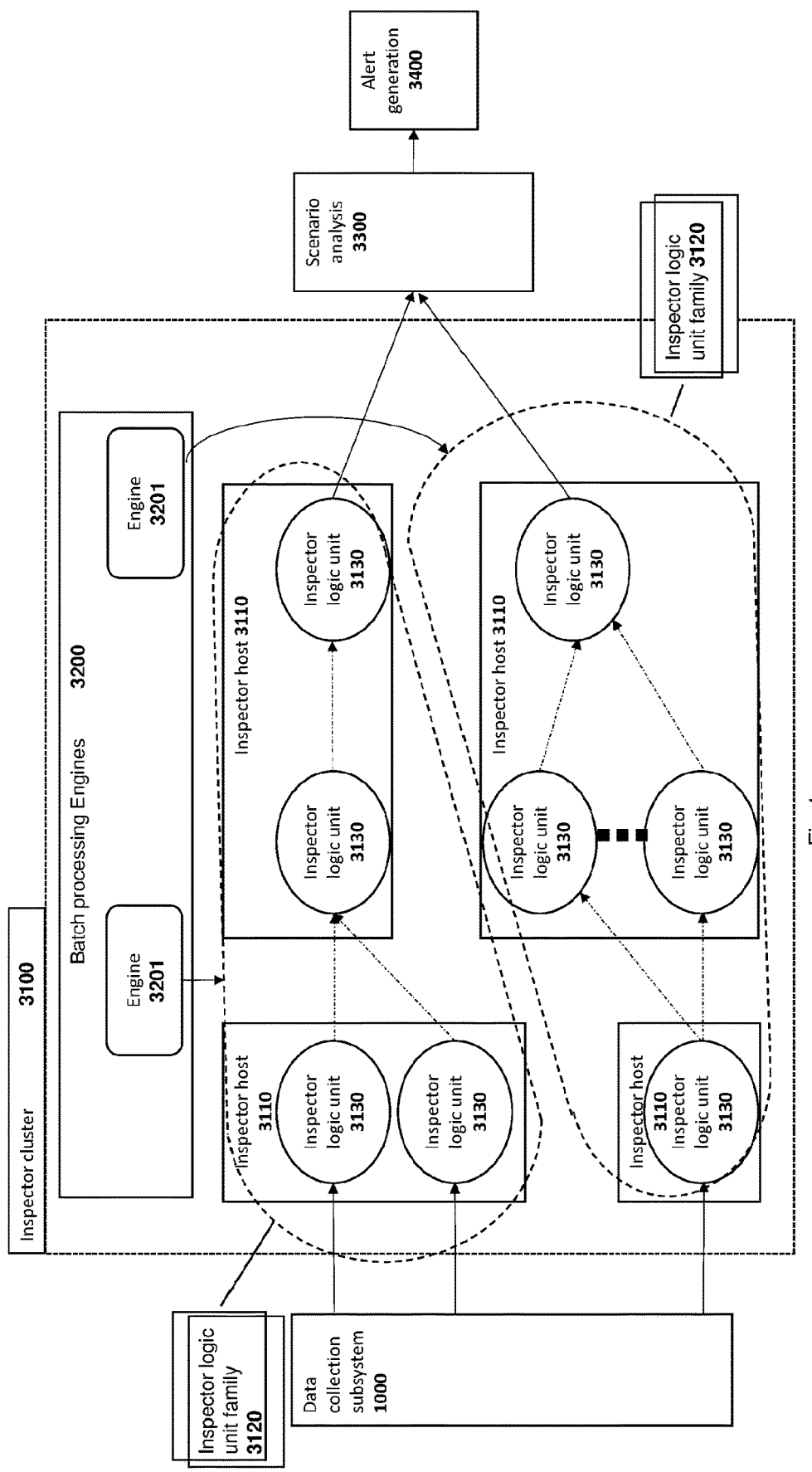
FIG. 4 illustrates a schematic block diagram of the Inspector cluster, and the collector-data flow through it, en-route the scenario analysis 3300 and Alert generation 3400 modules.

FIG. 4 shows a schematic block diagram of the Inspector cluster 3100, and the collector-data flow through it, en-route Scenario analysis and Alert generation, according to one embodiment of the invention.

Inspector hosts 3110 are computers which serve as building blocks of the Inspector Cluster 3100. The Inspectors partake in cluster computing; analyzing scenarios according to incoming data, storing required information, and producing alerts information en-route the Front-end subsystem 2000. The data flow comprising the Scenario analysis and Alerts generation logic is described in detail further below.

The computational activity of Inspectors is divided into basic logic units referred to as "Inspector logic units" 3130. The operation of these Inspector logic units 3130 is managed by central modules referred to as 'Engines' 3201. The data flow comprising the Inspector logic units is described in detail further below.

Each Engine is responsible for the allocation of system resources (e.g. hosting computer 3110, dedicated memory and number of CPUs), ordering, and prioritizing of the activity of Inspector logic units 3130.

The block diagram in FIG. 4 depicts an Inspector cluster in which multiple Inspector logic units are aggregated to "Inspector logic unit families" 3120. Each such family 3120 is managed by a single 'Engine' 3201, thus implementing increasingly more complex computational tasks.

The data input to each Inspector logic unit family 3120 is directly received from the Data collection subsystem 1000. It is received by input-level Inspector logic units 3130. The data output of each Inspector logic unit family 3120 is propagated to the Scenario analysis module 3300 by an output-level Inspector logic unit 3130.

According to some embodiments of the presented invention, the computational complexity of the Inspector cluster 3100 may be further enhanced, by implementing multiple Inspector logic unit families 3120, managed by a multiple Engines 3201, as depicted on FIG. 4.

Figure 5:
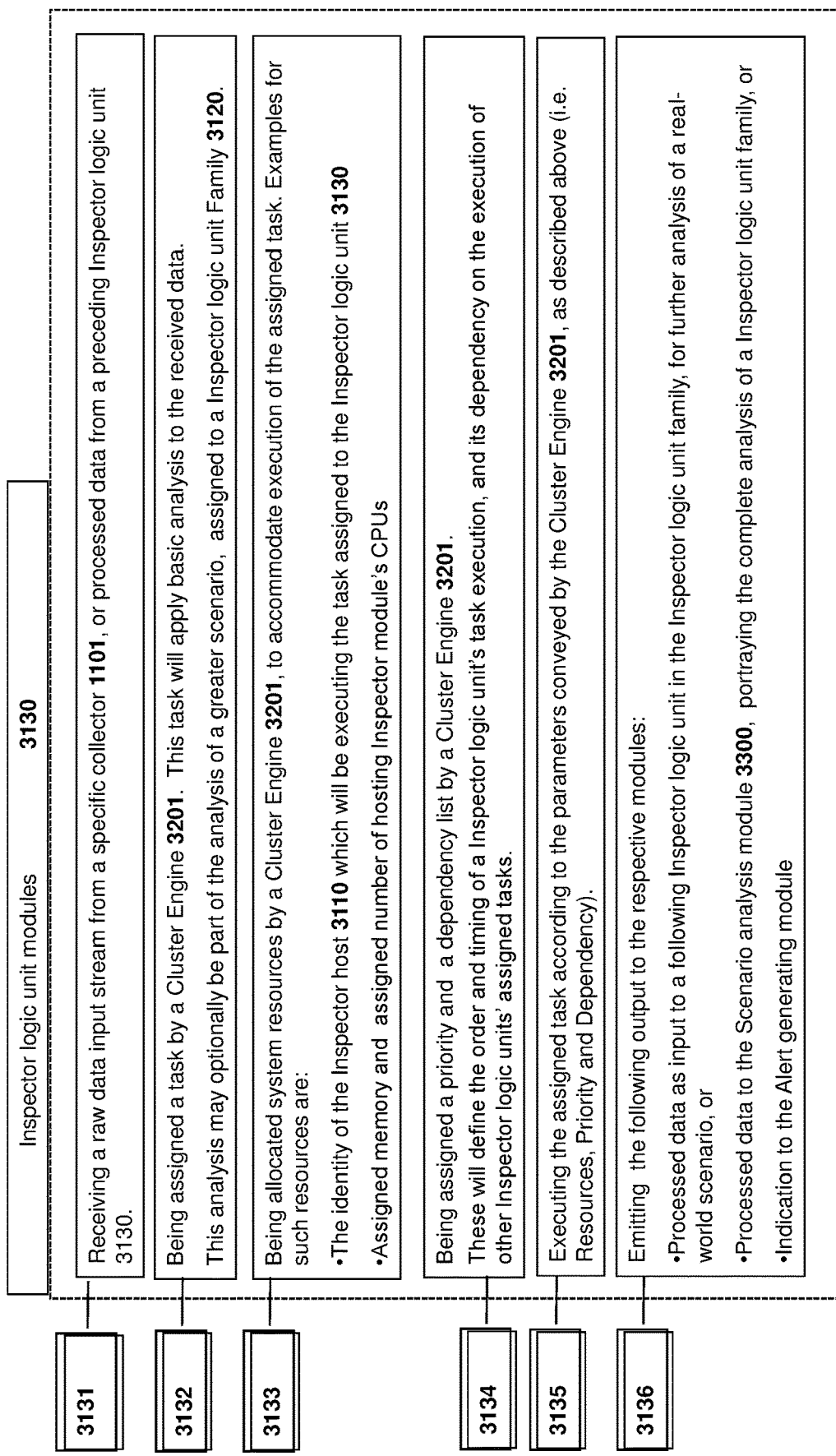
FIG. 5 illustrates a flow diagram describing the process that is executed on each Inspector logic unit 3130 module.

FIG. 5 shows a flow diagram describing the process that is executed on each Inspector logic unit module 3130 according to one embodiment. Inspector logic units perform specific atomic tasks on predefined computers. They may be linked to other Inspector logic units 3130, creating an Inspector logic unit family 3120 to partake in a wider computational process comprised of multiple computational tasks.

3131: Each Inspector logic unit module 3130 receives its input as a raw data input stream from a specific collector 1101, or processed data from a preceding Inspector logic unit 3130, in an Inspector logic unit family 3120.

3132: The Inspector logic unit module is assigned a task by a Cluster Engine 3201. This task will apply basic analysis to the received data. This task may optionally be part of the analysis of a greater scenario, assigned to an Inspector logic unit Family 3120.

3133: The Inspector logic unit is allocated system resources by a Cluster Engine 3201, to accommodate the execution of the assigned task. Examples for such resources are:

The identity of the Inspector host 3110 which is assigned the task, and

The assigned memory and assigned number of hosting Inspector 3110 module's CPUs

3134: The Inspector logic unit 3130 is assigned a priority and a dependency list by a Cluster Engine 3201. These will define the order and timing of an Inspector logic unit's task execution, and its dependency on the execution of other Inspector logic units' assigned tasks within an Inspector logic unit family 3120.

3135: The Inspector logic unit 3130 executes the assigned task according to the parameters conveyed by the Cluster Engine 3201, as described above (i.e. Resources, Priority and Dependency).

Figure 6:
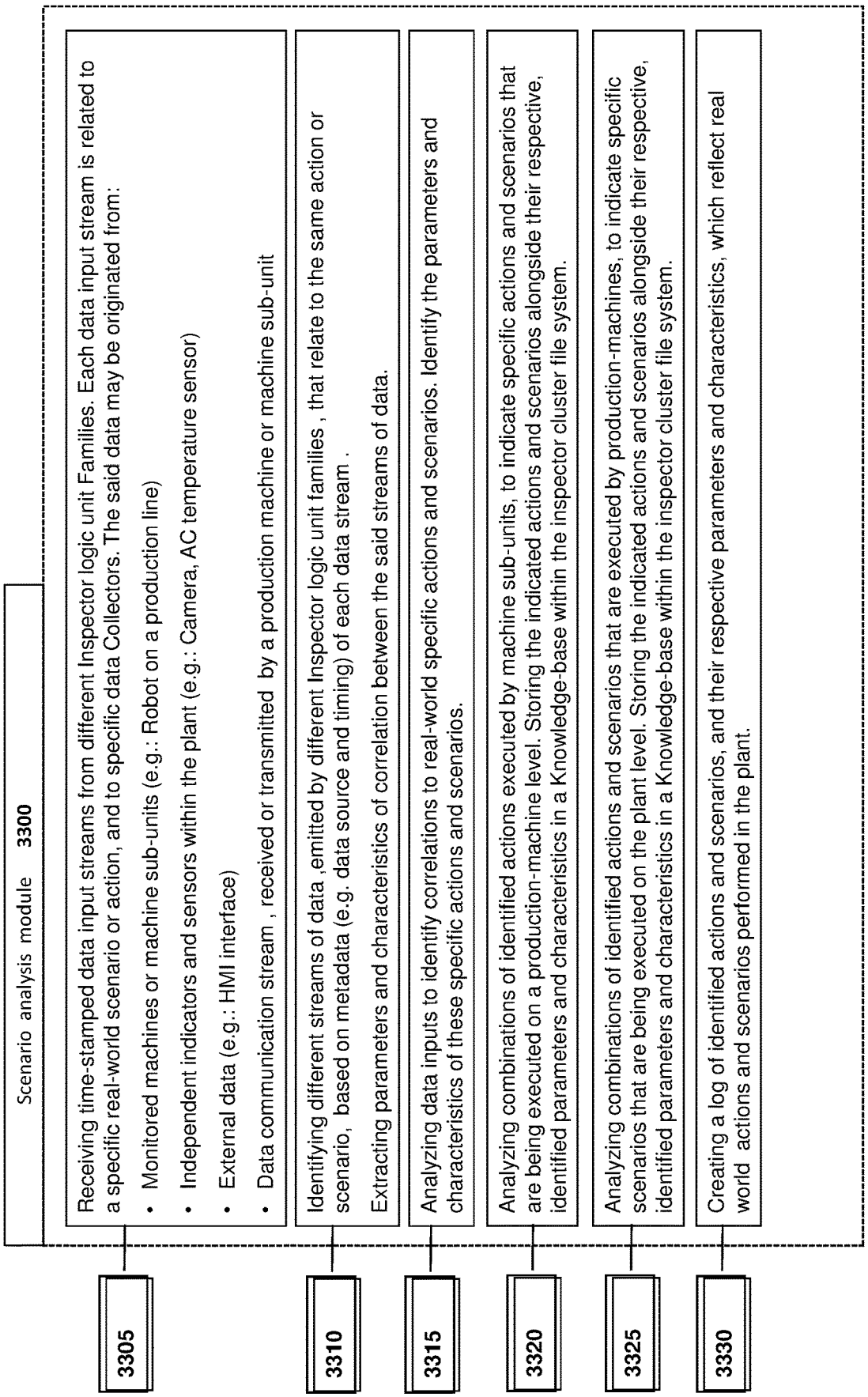

3136: The Inspector logic unit 3130 emits the following output to the respective modules:

Processed data as input to a following Inspector logic unit 3130 in the Inspector logic unit family 3120, for further analysis of a real-world scenario, or Processed data to the Scenario analysis module 3300, portraying the complete analysis of an Inspector logic unit family 3120, or Indication to the Alert generating module FIGS. 6 and 7 jointly present a flow diagram of the function of the Scenario analysis module 3300.

3305: The Scenario analysis module 3300 receives time-stamped data input streams from different Inspector logic unit Families. Each data input stream is related to a specific real-world scenario or action, and to specific data Collectors. The said data may be originated from:

Monitored machines or machine sub-units (e.g.: Robot on a production line)

Independent indicators and sensors within the plant (e.g.: Camera, AC temperature sensor)

External data (e.g.: captured video from screens of HMI interfaces)

Data communication stream, received or transmitted by a production machine or machine sub-unit

3310: The Scenario analysis module 3300 identifies different streams of data, emitted by different inspector logic unit families, that relate to the same action or scenario, based on metadata (e.g. data source and timing) of each data stream. It then extracts parameters of correlation between the said streams of data.

3315: The Scenario analysis module 3300 analyzes data inputs to identify correlations to real-world specific actions and scenarios. It extracts the parameters and characteristics of correlation between specific actions and scenarios that occur within the plant and different streams of data.

The scenario analysis module 3300 receives as an input captured video streams originating from various sources such as (but not limited to):

Dedicated Human Machine Interface (HMI) screens

Front-end operators' PC screens

On-site CCTV cameras

The scenario analysis module 3300 analyses the said video streams to identify human actions, such as: mouse movement, button clicks, selections, GUI elements' activation, text insertion, element changes, image changes, etc.

The said identified human actions are correlated with processes and conditions that take place in the plant, such as: machine status, production flow state, process status, stages within the process, configuration changes, user intervention, user identification, and misuse of equipment.

The scenario analysis module 3300 stores the parameters of the said correlations in the knowledgebase. According to one embodiment, The scenario analysis module 3300 stores selected video input streams according to predefined storage conditions and parameters for further reference and analysis; e.g. for improving human operators' reaction to predefined conditions.

3320: The scenario analysis module 3300 analyzes combinations of identified actions executed by machine sub-units, to indicate specific actions and scenarios that are being executed on a production-machine level. For example, the scenario analysis module 3300 may combine readings from actuator encoders, cameras and power meters to identify the occurrence of a specific action, such as a movement of a robotic arm on an assembly line. It may further combine several such identified actions to identify the occurrence of specific stages in a more comprehensive scenario, such as the process of painting a car by the said robotic arm. The scenario analysis module 3300 stores the indicated actions and scenarios alongside their respective, identified parameters and characteristics in the knowledgebase.

3325: The scenario analysis module 3300 analyzes combinations of identified actions and scenarios that are executed by production-machines, to indicate specific scenarios that are being executed on the plant level. It Stores the indicated actions and scenarios alongside their respective, identified parameters and characteristics in the knowledgebase.

3330: The scenario analysis module 3300 creates a log of identified actions and scenarios, and their respective parameters and characteristics, which reflect real world actions and scenarios performed in the plant.

3335: The scenario analysis module 3300 authenticates the correctness of production machines' operation during the execution of the said actions or scenarios, by correlating between data streams of monitored machines or machine sub-units and data streams of independent indicators and sensors (e.g. correlating the data of a robotic arm's motor decoders with the robot's position as indicated by a camera). The results of this authentication are propagated to the Alerts generation module.

3340: According to one embodiment, the scenario analysis module 3300 obtains expected input data streams 100 per each production machine's configuration (e.g.: the rotation speed of a motor in RPM, during a specific action). The said expected input data streams may be acquired for example by:
- configuration, according to prior knowledge, or
- by applying machine learning algorithms to ascertain the correlation between a given machine configuration and input data streams 100.

The scenario analysis module 3300 authenticates the configuration and function of production machines by comparing emitted data streams 100 with expected input streams.

3345: The scenario analysis module 3300 identifies irregularities in action or scenario parameters and characteristics based on the said authentication steps, and comparison of emitted data streams 100 with expected input streams. The said irregularities are analyzed to identify any of the following conditions:

Suspected System Malfunction
- Assume the following example: The output data stream of a vibration sensor on an assembly line displays intense vibrations, much beyond predefined expected values. The vibration sensor output data stream shows high correlation to the power consumption readings of a specific production machine. The scenario analysis module 3300 may deduce that the vibrations are caused by the operation of the production machine, and may indicate a malfunction due to the intense vibrations.

Suspected Erroneous System Configuration
- For example, a CCTV camera may be placed to monitor the function of a robotic arm, and may identify movement of the arm by a certain distance during operation. This information may be correlated with a list of required configurations per specific scenarios. Assuming that other input data streams relating to the said robot (e.g. power consumption, actuator encoders etc.) indicate that the robot is functioning properly, a difference between the required configuration and the identified movement of the robotic arm may be interpreted by the scenario analysis module 3300 as incorrect configuration.

Suspected Breach of Cyber Security
- According to one embodiment, the scenario analysis module 3300 may also monitor the conditions of Human-Machine Interfaces (HMIs), such as control panels, computer screens etc. It may also monitor and follow human interactions with the said human-machine interfaces. In relation to the same example of the robotic arm, above: If the robot is suspected to have been configured erroneously, whereas the scenario analysis module 3300 verifies that an HMI (Human-Machine Interface) presents the correct required configuration on its screen, the scenario analysis module 3300 may deduce that a cyber security breach has occurred, and the system was tampered with.

The scenario analysis module 3300 propagates irregularity notifications to the alerts generation module. The Scenario analysis module 3300 stores suspected irregularity events in the knowledgebase.

3350: The scenario analysis module 3300 creates a log of the said identified suspected irregularities in machine configuration or operation.

3355: The scenario analysis module 3300 extracts parameters and characteristics of correlation between data streams emitted by different monitored machines and machine sub-units, and applies machine learning algorithms to enhance the knowledgebase, and to identify the mutual effect of the said monitored units on one-another, following the execution of scenarios and actions.

3360: The scenario analysis module 3300 extracts parameters and characteristics of correlation between data streams emitted by monitored machines and machine sub-units (which are respective to actions and scenarios performed by the said machines and machine sub-units) and independent indicators and sensors within the plant (which represent the conditions in the plant).

The Scenario analysis module 3300 applies machine learning algorithms to identify the effect of the operation of the said monitored machines and machine sub-units on plant conditions (e.g. Physical, Chemical, Electrical conditions). It stores this information within the knowledgebase.

According to one embodiment, the Scenario analysis module 3300 applies machine learning algorithms to the data accumulated in the knowledgebase (e.g. parameters and characteristics of specific correlations between different data streams 100) to iteratively refine the analysis of actions and scenarios that occur within the plant, or set-up new analyses for that purpose.

For example: Assume a high level of correlation is detected between a microphone-recorded sound pattern and the power consumption of an electric engine.

Administrators will be informed of this detected information via the front end sub-system. They may be presented the option to add the said correlation as an additional indication for the engine's correct operation, i.e. lack thereof will be considered indicative of a malfunction.

According to one embodiment, the Scenario analysis module 3300 may be configured to perform said iterative refinement of the analysis automatically, i.e. without involving the user.

The knowledgebase also contains patterns of input data streams that reflect correct functionality on a plant level. Pertaining to the previous example, the recorded audio data pattern may indicate correct functionality of an entire assembly line, and not just a specific machine sub-unit. Attribution of correct functionality to a specific pattern may be obtained through algorithms of machine-learning or through input by an administrator in the Front-end subsystem 2000. Deviation of the input data pattern from the expected "correct functionality" pattern may produce an alert by the Alerts generation module.

The knowledgebase also contains patterns of correlation between data streams representing the actions of human operators (e.g. communication of all sorts, computer monitor screen capture, audio recording, video recording, etc.), and independent data streams which relate to scenarios and actions that take place in the plant are also maintained in the knowledgebase. This information serves to study and promote the efficiency and security of human operators' actions in response to specific scenarios.

The information accumulated in the Knowledgebase also serves to enhance the efficiency and security of production machines throughout the plant, improve current processes and scenarios, and design new processes in accordance with the assembled information.

The Knowledgebase also maintains a database of historic events of real world scenarios and actions, and their respective data stream parameters and characteristics. This information can be queried by the Front-end administrator for further analysis according to timing, actions and events, and in regards to specific machines, units and modules in the plant.

Figure 8:
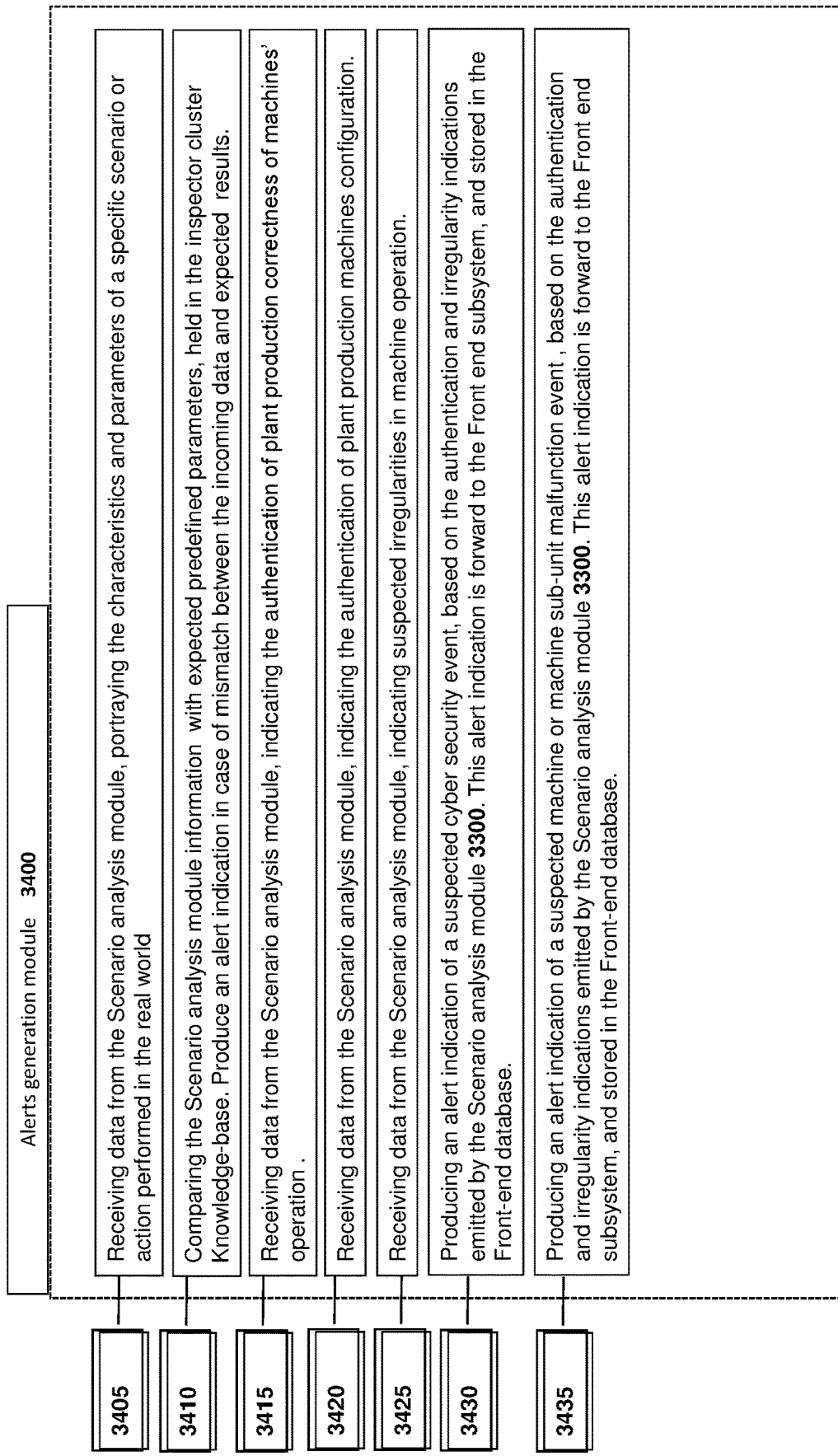
FIG. 8 illustrates a flow of the function of the Alerts generation module 3400.

FIG. 8 shows a flow diagram of the function of the Alerts generation module 3400.

3405: The Alerts generation module 3400 receives data from the scenario analysis module 3300, portraying the characteristics and parameters of a specific scenario or action performed in the real world.

3410: The Alerts generation module 3400 compares the scenario analysis module's 3300 information with expected predefined parameters, held in the knowledgebase, and may generate alert indications in case of a mismatch between the incoming data and expected results (e.g.: a machine has failed to perform a certain action as many times as it was supposed to)

3415, 3420, 3425: The Alerts generation module 3400 receives data from the scenario analysis module 3300 indicating:
   Authentication of plant production machines' configuration
   Correctness of plant production machines' operation,
   Suspected irregularities in machine operation.

3430: The Alerts generation module 3400 produces an alert indication of a suspected cyber security event, based on the authentication and irregularity indications emitted by the Scenario analysis module 3300.

3435: The Alerts generation module 3400 produces an alert indication of a suspected machine or machine sub-unit malfunction event, or of an erroneous configuration, based on the authentication and irregularity indications emitted by the scenario analysis module 3300.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer usable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for analyzing actions that are taking place in a plant or a factory, implemented by one or more processors operatively coupled to a non-transitory computer readable storage device, on which are stored modules of instruction code that when executed cause the one or more processors to perform the steps of:
    monitoring a plurality of data streams originating from a plurality of independent data sources within the plant or factory, wherein the monitoring includes tapping onto production machines and machine sub-units;
    correlating between two or more monitored data streams relating to a specific action occurring within the plant but originating from different data sources, or being of different data types; and
    analyzing said data stream correlations to obtain specific parameters and characteristics that indicate the occurrence of specific actions and scenarios that have taken place in the plant;
    wherein said analyzing is performed at a production-machine level and configured to deduce information regarding operation of the production machines and machine sub-units, in respect to the specific actions and scenarios that are taking place in the plant by identifying correlations between different sensory data sources which are correlated to the specific actions and scenarios and provide indications for the functionality of the production machines and machine sub-units,
    wherein the production-machine level analysis is an inter-operability analysis comprising monitoring and analyzing operation of the production machines and machine sub-units and extracting the specific parameters and characteristics relating to mutual influence of the production machines and machine sub-units during performance of the specific actions and scenarios within the plant,
    wherein plant-level operative deductions are achieved by integrating information from a lower-level scenario analysis of production machine and machine sub-unit inter-operability to obtain comprehensive and real-time reflection of the specific actions and scenarios that are being performed in the plant,
    wherein said analyzing analyses video streams to identify human actions including at least one of: mouse movement, button clicks, selections, graphic user interface (GUI) elements activation, text insertion, element changes, and image changes,
    wherein said identified human actions are correlated with processes and conditions that take place in the plant, including: machine status, production flow state, process status, stages within a process, configuration changes, user intervention, user identification, and misuse of equipment;
    wherein said analyzing is further configured to authenticate correctness of the operation of the production machines and machine sub-units during execution of the specific actions and scenarios, based on correlating between different types of data streams of monitored machines and machine sub-units and data streams of independent indicators and sensors,
    wherein said analyzing further includes the followings steps:
        identifying an occurrence of the actions within the plant;
        identifying the scenarios that are comprised of the actions, said scenarios taking place within the plant at any hierarchical level;
        identifying status of the machines and machine sub-units within said scenarios;
        identifying influence of the operation of the production machines and machine sub-units on measurable physical, chemical or electrical conditions within the plant;
        determining correctness of configuration and operation of the production machines and machine sub-units, in respect to the actions and scenarios that are taking place in the plant; and
        assessing probability for a system malfunction or cyber security breach event based on the correction determination;
    wherein said analyzing further includes generating a knowledge base which contains patterns of input data streams that reflect correct functionality on a plant level, wherein the patterns of input data streams indicate correct functionality of an entire assembly line and a specific machine sub-unit, wherein attribution of correct functionality to a specific pattern is obtained through algorithms of machine-learning applied at the specific machine sub-unit and process level; and
    wherein deviation of the input data pattern from an expected correct functionality pattern produces an alert.

2. The method of claim 1, wherein at least one said correlated data stream originates from tapping onto the production machines and machine sub-units within the plant, and another said correlated data stream originates from the sensors and indicators located within the plant's production systems or environment.

3. The method of claim 1, further comprising at least one of the following steps:
applying a machine learning algorithm to extract the specific characteristics and parameters of said data stream correlations, and identify the mutual influence of the production machines and machine sub-units on each other within the plant; and
applying the machine learning algorithm to extract the specific characteristics and parameters of said data stream correlations, and identify mutual effect of the operation of the production machines and machine sub-units on the conditions in the plant, said conditions including at least one of physical, chemical, electrical and environmental conditions.

4. The method of claim 3 further comprising the step of applying machine learning algorithms to said extracted characteristics and parameters of said data steam correlations, thereby iteratively refining the analysis of actions and scenarios taking place within the plant.

5. The method of claim 3, further comprising the step of obtaining expected characteristics and parameters of the monitored data streams by:
applying the machine learning algorithm to extract correlation between specific machine configurations and the characteristics and parameters of the monitored data streams; or
user configuration, according to prior knowledge.

6. The method of claim 5, further comprising the steps of:
comparing said expected characteristics and parameters of said monitored data streams with the characteristics and parameters of the input data streams; and
identifying conditions of production machines' malfunction or configuration problems according to differences found in said comparison.

7. The method of claim 6, further comprising steps of:
analyzing suspected malfunction in relation to at least one additional input data stream, and in relation to a list of required system configurations; and
identifying suspected conditions of erroneous system configuration according to said analyzing.

8. The method of claim 7, further comprising the steps of:
obtaining the video streams originating from various human interface sources, including at least one of: dedicated Human Machine Interface (HMI) screens, front-end operators' personal computer (PC) screens, control panels and on-site closed circuit television (CCTV) cameras;
identifying conditions of said human interface sources;
monitoring the human actions applied to said human interface sources, including at least one of mouse movements, button clicks, GUI selections, GUI elements' activation, text insertion, element changes and image changes; and
identifying application of the human actions to processes within the plant, including at least one of: user intervention, configuration changes, and misuse of equipment.

9. The method of claim 8, further comprising the steps of:
analyzing said suspected condition of erroneous system configuration in relation to monitored data pertaining to said human interface sources; and
identifying suspected conditions of cyber security breaches according to said analysis.

10. The method of claim 1, wherein communication between sources of the input data streams and a system which analyzes said input data streams is unidirectional, thus disabling the configuration of the data sources from said system, and providing security against cyber attacks targeting said data sources.

11. The method of claim 10, wherein communication between the data sources of the input data streams and a scenario analyzer that performs the scenario analysis is unidirectional, and thus the configuration of the data sources is disabled from said scenario analyzer, and providing the security against cyber attacks targeting said data sources.

12. The method of claim 5, further comprising the step of maintaining the knowledge base withholding at least part of the following information:
historical actions and scenarios that have been executed throughout the plant;
historical events of system alerts and irregularities in data authentication;
the expected characteristics and parameters of correlation between the input data streams of different sources;
expected output data of specific production machines and machine sub-units, following the execution of the actions and scenarios by said specific production machines and machine sub-units; and
observed actual output data of the specific production machines and machine sub-units, following the execution of the actions and scenarios, wherein said knowledge base is made accessible for data querying by administrative users via a front-end subsystem.

13. The method of claim 12 wherein said front-end subsystem is the only human interface to the system, said front-end subsystem is set as an encrypted and separated environment, and is connected to the system via unidirectional communication, thus facilitating at least one of the following measures of precaution for maintaining cyber security:
authorized users are granted permission to configure the analysis system;
users are denied access to the actual sources of input data streams; and
the users are granted read-only access to the knowledge base.

14. A system for analyzing actions that are taking place in a plant or a factory, comprising one or more non-transitory computer readable storage devices and one or more processors operatively coupled to the storage devices on which are stored modules of instruction code executable by the one or more processors, said system comprising at least part of:
a collector cluster, comprising at least one collector, configured to monitor a plurality of data streams, originating from a plurality of independent data sources within the plant, wherein the monitoring includes tapping onto production machines and machine sub-units;
a scenario analyzer, correlating between two or more monitored data streams that are related to a specific action occurring within the plant, but originating from different data sources, or are of different data types;
wherein said scenario analyzer is further configured to analyze correlations of said monitored data stream, and obtain specific parameters and characteristics that indicate the occurrence of specific actions and scenarios that are taking place in the plant;
wherein the scenario analyzer is configured to perform at production-machine level analysis and configured to deduce information regarding operation of the production machines and machine sub-units, in respect to the specific actions and scenarios that are taking place in the plant by identifying correlations between different sensory data sources which are correlated to the specific actions and scenarios and provide indications for the functionality of the production machines and machine sub-units;

wherein the production-machine level analysis is an inter-operability analysis comprising monitoring and analyzing operation of the production machines and machine sub-units and extracting the specific parameters and characteristics relating to mutual influence of the production machines and machine sub-units during performance of the specific actions and scenarios within the plant;

wherein plant-level operative deductions are achieved by integrating information from a lower-level scenario analysis of production machine and machine sub-unit inter-operability to obtain comprehensive and real-time reflection of the specific actions and scenarios that are being performed in the plant;

wherein the scenario analyzer analyses video streams to identify human actions including at least one of: mouse movement, button clicks, selections, graphical user interface (GUI) elements activation, text insertion, element changes, and image changes;

wherein said identified human actions are correlated with processes and conditions that take place in the plant, including: machine status, production flow state, process status, stages within a process, configuration changes, user intervention, user identification, and misuse of equipment;

wherein the scenario analyzer is further configured to authenticate correctness of the operation of the production machines and machine sub-units during execution of the specific actions and scenarios, based on correlating between different types of data streams of monitored machines and machine sub-units and data streams of independent indicators and sensors;

wherein the scenario analyzer is further configured to perform the followings steps:
identifying an occurrence of the actions within the plant;
identifying the scenarios that are comprised of said actions, said scenarios taking place within the plant at any hierarchical level;
identifying status of the machines and machine sub-units within said scenarios;
identifying influence of the operation of the production machines and machine sub-units on measurable physical, chemical or electrical conditions within the plant;
determining correctness of configuration and operation of the production machines and machine sub-units, in respect to the actions and scenarios that are taking place in the plant; and
assessing probability for a system malfunction or cyber security breach event based on the correction determination;
wherein the scenario analyzer is further configured to generate a knowledge base which contains patterns of input data streams that reflect correct functionality on a plant level, wherein the patterns of input data streams indicate correct functionality of an entire assembly line and a specific machine sub-unit, wherein an attribution of correct functionality to a specific pattern is obtained through algorithms of machine-learning applied at the machine sub-unit and process level; and wherein deviation of the input data pattern from an expected correct functionality pattern produces an alert.

15. The system of claim 14, wherein at least one of said data stream originates from tapping onto the production machines and machine sub-units within the plant, and at least one other said data stream originates from the sensors and indicators located within the plant's production systems or environment.

16. The system of claim 14, wherein the scenario analyzer is further configured to perform at least one of the following:
applying a machine learning algorithm to extract the specific characteristics and parameters of said data stream correlations, and identify the mutual influence of the machines and machine sub-units on each other within the plant; and
applying the machine learning algorithm to extract the specific characteristics and parameters of said data stream correlations, and identify mutual effect of the operation of the production machines and machine sub-units on the conditions in the plant, said conditions including at least one of physical, chemical, electrical and environmental conditions.

17. The system of claim 16, wherein the scenario analyzer is further configured to apply machine learning algorithms to said extracted characteristics and parameters of said data stream correlations, thereby iteratively refining the analysis of actions and scenarios taking place within the plant.

18. The system of claim 16, wherein the scenario analyzer is further configured to obtain said expected characteristics and parameters of the monitored data streams by:
applying the machine learning algorithm to extract correlation between specific machine configurations and the characteristics and parameters of the monitored data streams; or
user configuration, according to prior knowledge.

19. The system of claim 18, wherein the scenario analyzer is further configured to:
compare said expected characteristics and parameters of said plurality of data streams with the characteristics and parameters of the input data streams; and
identify conditions of production machines' malfunction or configuration problems according to differences found in said comparison.

20. The system of claim 19, wherein the scenario analyzer is further configured to:
obtain the video streams originating from various human interface sources, including at least one of: dedicated Human Machine Interface (HMI) screens, front-end operators' personal computer (PC) screens, control panels and on-site closed circuit television (CCTV) cameras;
identify conditions of said human interface sources;
monitor the human actions applied to said human interface sources, including at least one of mouse movements, button clicks, graphical user interface (GUI) selections, GUI elements' activation, text insertion, element changes and image changes; and
identify application of the human actions to processes within the plant, including at least one of: user intervention, configuration changes, and misuse of equipment.

21. The system of claim 14, wherein communication between the data sources of the input data streams and the scenario analyzer is unidirectional, thus the configuration of the data sources is disabled from said scenario analyzer, and providing security against cyber attacks targeting said data sources.

22. The system of claim 18, further comprising the knowledge base withholding at least part of the following information:
- historical actions and scenarios that have been executed throughout the plant;
- historical events of system alerts and irregularities in data authentication;
- the expected characteristics and parameters of correlation between the input data streams of different sources;
- expected output data of specific machines and machine sub-units, following the execution of the actions and scenarios by said specific machines and machine sub-units; and
- observed actual output data of the specific machines and machine sub-units, following the execution of the actions and scenarios, wherein said knowledge base is configured to be accessible for data querying by administrative users via a front-end subsystem.

23. The system of claim 22 wherein said front-end subsystem is an encrypted environment, communicatively connected to said knowledge base and scenario analyzer via unidirectional communication, thus providing at least one of the following measures of precaution for maintaining cyber security:
- granting authorized users permission to configure the scenario analyzer;
- denying users access to actual producers of the input data streams; and
- granting the users read-only access to the knowledge base.

* * * * *